United States Patent
Moriya et al.

(10) Patent No.: US 9,359,989 B2
(45) Date of Patent: Jun. 7, 2016

(54) CONTROL DEVICE FOR ENGINE, METHOD OF CONTROLLING ENGINE, ENGINE STARTING DEVICE, AND VEHICLE

(75) Inventors: Kouki Moriya, Aichi-gun (JP); Jumpei Kakehi, Toyota (JP); Hasrul Sany Bin Hashim, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 296 days.

(21) Appl. No.: 14/004,600

(22) PCT Filed: Mar. 15, 2011

(86) PCT No.: PCT/JP2011/056013
§ 371 (c)(1),
(2), (4) Date: Sep. 11, 2013

(87) PCT Pub. No.: WO2012/124050
PCT Pub. Date: Sep. 20, 2012

(65) Prior Publication Data
US 2014/0001768 A1    Jan. 2, 2014

(51) Int. Cl.
F02N 11/00 (2006.01)
F02N 11/08 (2006.01)
F02N 15/06 (2006.01)
F02N 11/10 (2006.01)

(52) U.S. Cl.
CPC ........ *F02N 11/0851* (2013.01); *F02N 11/0814* (2013.01); *F02N 11/108* (2013.01); *F02N 15/06* (2013.01); *Y02T 10/48* (2013.01)

(58) Field of Classification Search
CPC ..... F02N 15/04; F02N 11/101; F02N 11/087; F02N 11/108; F02N 11/0825; F02N 11/0862; F02N 2250/02; Y10N 477/23; Y02T 10/48
USPC .......... 701/101, 102, 110, 111, 112, 113; 123/179.4, 179.3, 480, 481, 198 F; 73/114.58, 114.59, 114.61
See application file for complete search history.

(56) References Cited

U.S. PATENT DOCUMENTS

| | | | | |
|---|---|---|---|---|
| 8,498,772 B2* | 7/2013 | Kanemoto | .......... | F02N 11/0825 701/29.1 |
| 8,590,500 B2* | 11/2013 | Notani | ................ | F02N 11/0844 123/179.25 |
| 2008/0127927 A1 | 6/2008 | Hirning et al. | | |
| 2010/0090526 A1 | 4/2010 | Itou | | |
| 2012/0271508 A1* | 10/2012 | Kanemoto | .......... | F02N 11/0825 701/33.6 |

FOREIGN PATENT DOCUMENTS

| | | |
|---|---|---|
| DE | 10 2005 004 326 A1 | 2/2006 |
| EP | 2 159 410 | 3/2010 |
| JP | 2010 90874 | 4/2010 |

OTHER PUBLICATIONS

International Search Report Issued Apr. 19, 2011 in PCT/JP2011/056013 Filed Mar. 15, 2011.

* cited by examiner

*Primary Examiner* — Hai Huynh
*Assistant Examiner* — Raza Najmuddin
(74) *Attorney, Agent, or Firm* — Oblon, McClelland, Maier & Neustadt, L.L.P.

(57) ABSTRACT

A vehicle includes a starter used for starting an engine and including an actuator performing an engagement operation with a pinion gear and a motor rotating the pinion gear that are separately controllable. When starting the engine by the user's key operation, a start request signal caused by the key operation is delayed in a delay circuit to output a control signal for driving the motor. When restarting an engine after the engine is automatically stopped, a malfunction detection unit detects a malfunction in the delay circuit based on a control signal for driving the actuator and the control signal for driving the motor.

9 Claims, 5 Drawing Sheets

CONTROL DEVICE FOR ENGINE, METHOD OF CONTROLLING ENGINE, ENGINE STARTING DEVICE, AND VEHICLE

TECHNICAL FIELD

The present invention relates to a control device for an engine, a method of controlling the engine, an engine starting device, and a vehicle, and more particularly to control of an engine starter by which an engagement mechanism for engaging a pinion gear with a ring gear of the engine and a motor for rotating the pinion gear can be separately driven.

BACKGROUND ART

For the purposes of fuel efficiency improvement, exhaust emission reduction and the like, some automobiles having an internal combustion engine and the like as an engine may be provided with the so-called idling stop or economy running function (which will be hereinafter simply referred to as "eco-run") of automatically stopping the engine in the state where the vehicle stops and the driver operates a brake pedal and also automatically restarting the engine by the driver's operation for restarting the vehicle, for example, by decreasing the operated amount of the brake pedal to the level of zero.

Furthermore, there is also a starter for starting the engine in which an engagement mechanism for engaging the pinion gear of the starter with the ring gear of the engine and a motor for rotating the pinion gear can be separately driven. In addition, when starting the engine, such an approach may be employed that the engine is cranked by the motor after the pinion gear is engaged with the ring gear.

In the case where such a starter is used to start the engine, when automatically restarting the engine as described above, the control device controls the driving signals for the above-described pinion gear and motor to be output at an appropriate timing. However, when first starting the engine from the state where the vehicle stops, the output voltage of the battery is lowered, for example, due to deterioration, temperature decrease and the like, which may prevent the control device from being activated. This may cause a situation where the engine cannot be appropriately started.

For solving the above-described problem, Japanese Patent Laying-Open No. 2010-090874 (PTL 1) discloses a configuration in which, when starting the engine by an ignition key, an engagement mechanism is driven by a start request signal caused by the ignition key to perform an engagement operation with the pinion gear while driving the motor by using a signal obtained by delaying this start request signal in the delay circuit.

CITATION LIST

Patent Literature

PTL 1: Japanese Patent Laying-Open No. 2010-090874
PTL 2: EP 2159410 A

SUMMARY OF INVENTION

Technical Problem

According to the configuration disclosed in Japanese Patent Laying-Open No. 2010-090874 (PTL 1), since the driving signal for the engagement mechanism and the motor can be supplied without being passed through the control device, the engine can be started even when the control device cannot be used.

In such a delay circuit, however, when an appropriate delaying operation is not performed, for example, due to a short-circuit fault occurring in the inner terminal, thereby causing a signal to be output in a time period shorter than a desired delaying time period, the rotating pinion gear may be brought into contact with the ring gear. This may not only prevent an appropriate engagement between the pinion gear and the ring gear, but also lead to wear-out and breakage of these gears and also lead to increased noise caused by contact between these gears, with the result that the user may feel discomfort.

Accordingly, it becomes necessary to detect a failure in the delay circuit, but no consideration is taken in Japanese Patent Laying-Open No. 2010-090874 (PTL 1) about such a failure detection for the delay circuit.

The present invention has been made to solve the above-described problems. An object of the present invention is to detect a malfunction in a delay circuit in an engine that is provided with a starter in which a pinion gear and a motor rotating the pinion gear can be separately controlled, and that uses the delay circuit for providing an output of a motor drive command at startup by using a key.

Solution To Problem

A control device for an engine according to the present invention controls an engine provided with a starter including a second gear that can be engaged with a first gear coupled to a crankshaft; an actuator causing, in a driven state, the second gear to be moved to a position at which the second gear engages with the first gear; and a motor rotating the second gear. The actuator and the motor are separately controllable by a signal driving the actuator and a signal driving the motor, respectively. The control device includes a delay circuit, upon reception of a manually-operable start request, delaying the signal driving the actuator generated by the start request to generate the signal driving the motor. When restarting the engine after the engine is automatically stopped, the control device generates the signal driving the actuator and the signal driving the motor, and detects a failure in the delay circuit based on an output status of each of the signal driving the actuator and the signal driving the motor.

Preferably, the control device further includes a control unit generating the signal driving the actuator and the signal driving the motor when restarting the engine after the engine is automatically stopped. When restarting the engine and after providing an output of the signal driving the actuator, in a case where the signal driving the motor is output from the control device even though the signal driving the motor is not output from the control unit, the control unit extends a time period from a time when the signal driving the actuator is output until a time when the signal driving the motor is output, such that the time period is longer than a time period in a case where the signal driving the motor is not output from the control device in the state where the signal driving the motor is not output from the control unit.

Preferably, the control device further includes a detection unit for detecting a failure in the delay circuit. When restarting the engine, in the case where the signal driving the motor is output from the control device even though the signal driving the motor is not output from the control unit, the detection unit determines that a failure occurs in the delay circuit.

Preferably, the detection unit determines that a true failure occurs in the delay circuit, when a state determined as a failure occurring in the delay circuit continues for a predetermined first time period.

Preferably, the detection unit makes a determination of the true failure on a travelling course on which a failure in the delay circuit is determined.

Preferably, the detection unit makes a determination of the true failure on a travelling course subsequent to the travelling course on which a failure in the delay circuit is determined.

Preferably, when the detection unit determines that a true failure occurs in the delay circuit, the detection unit notifies a user of occurrence of a failure in the delay circuit.

Preferably, after it is determined that a failure occurs in the delay circuit, and when the state continues for a second time period that the signal driving the motor is not output from the control device in the state where the signal driving the motor is not output from the control unit, the control unit cancels a determination that a failure occurs in the delay circuit.

Preferably, the control unit limits startup of the engine using the delay circuit when it is determined that a failure occurs in the delay circuit.

Preferably, the control unit limits an automatic stop of the engine using the delay circuit when it is determined that a failure occurs in the delay circuit.

A vehicle according to the present invention includes an engine, a starter, and a control device controlling the starter. The starter includes a second gear that can be engaged with a first gear coupled to a crankshaft, an actuator causing, in a driven state, the second gear to be moved to a position at which the second gear engages with the first gear, and a motor rotating the second gear. The actuator and the motor are separately controllable by a signal driving the actuator and a signal driving the motor, respectively. The control device includes a delay circuit, upon reception of a manually-operable start request, delaying the signal driving the actuator generated by the start request to generate the signal driving the motor. When restarting the engine after the engine is automatically stopped, the control device generates the signal driving the actuator and the signal driving the motor, and detects a failure in the delay circuit based on an output status of each of the signal driving the actuator and the signal driving the motor.

Advantageous Effects of Invention

According to the present invention, in the engine that is provided with a starter in which a pinion gear and a motor rotating the pinion gear can be separately controlled, and that uses a delay circuit for providing an output of a motor drive command at startup by using a key, a malfunction in the delay circuit can be detected. This allows the starter to be improved in noise-silencing performance and durability.

DESCRIPTION OF EMBODIMENTS

The embodiments of the present invention will be hereinafter described with reference to the accompanying drawings. In the following description, the same components are designated by the same reference characters. Names and functions thereof are also the same. Therefore, detailed description thereof will not be repeated.

Figure 1:
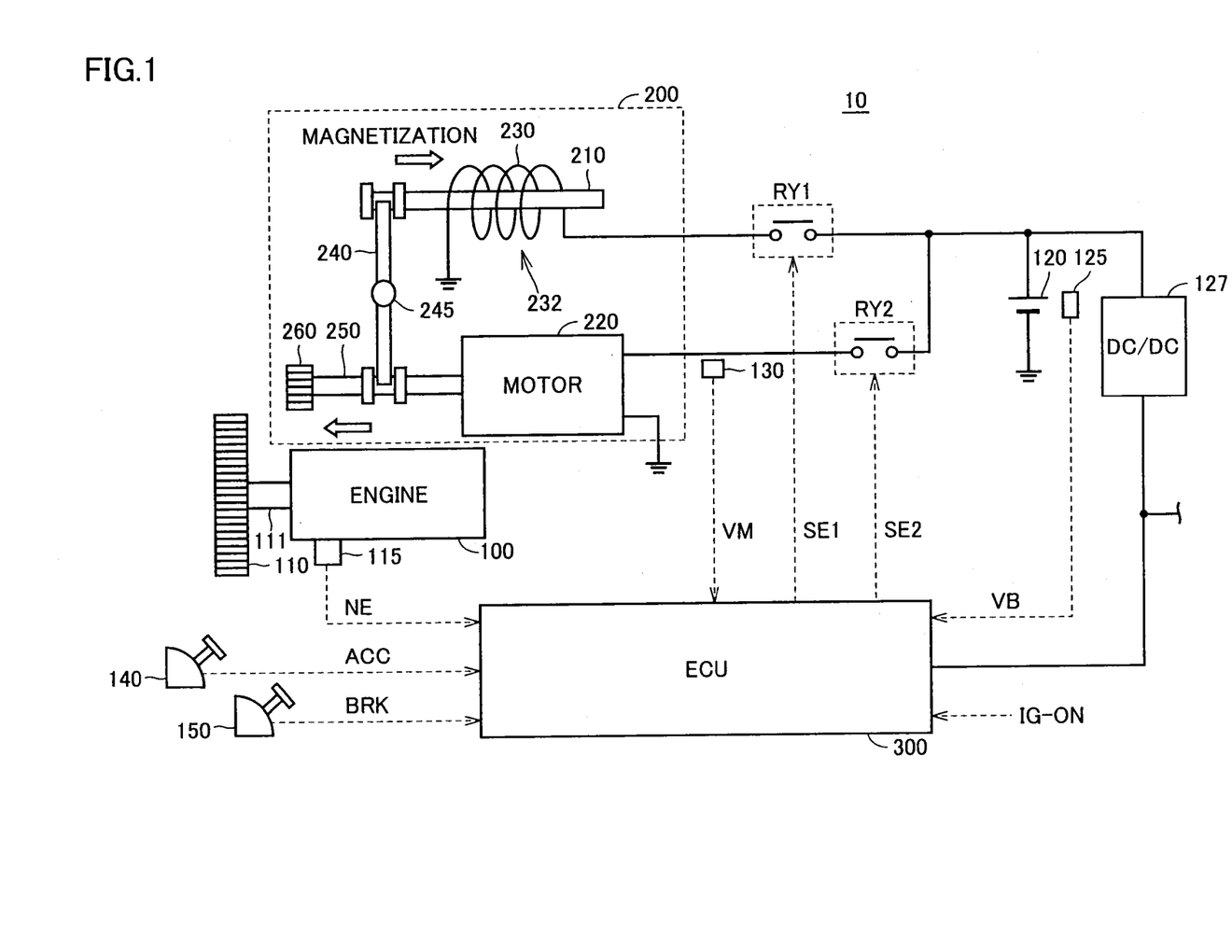
FIG. 1 is an entire block diagram of a vehicle equipped with a control device for an engine according to the present embodiment.

FIG. 1 is an entire block diagram of a vehicle 10 provided with a control device for an engine according to the present embodiment. Referring to FIG. 1, vehicle 10 includes an engine 100, a battery 120, a starter 200, a control device (which will be hereinafter also referred to as an ECU (Electronic Control Unit)) 300, and relays RY1 and RY2. Starter 200 includes a plunger 210, a motor 220, a solenoid 230, a connection unit 240, an output member 250, and a pinion gear 260.

Engine 100 generates driving force for causing vehicle 10 to run. Engine 100 has a crankshaft 111 that is connected to a driving wheel via a powertrain configured to include a clutch, a reduction gear and the like.

Engine 100 is provided with a rotation speed sensor 115. Rotation speed sensor 115 detects a rotation speed NE of engine 100 and outputs the detection result to ECU 300.

Battery 120 is a chargeable and dischargeable electric power storage component. Battery 120 is configured to include a secondary battery such as a lithium ion battery, a nickel-metal hydride battery or a lead acid battery. Battery 120 may also be configured of a power storage element such as an electric double-layer capacitor.

Battery 120 is connected to starter 200 via relays RY1 and RY2 controlled by ECU 300. By closing relays RY1 and RY2, battery 120 supplies a driving power supply voltage to starter 200. In addition, the negative electrode of battery 120 is connected to the body earth of vehicle 10.

Battery 120 is provided with a voltage sensor 125. Voltage sensor 125 detects an output voltage VB of battery 120, and outputs the detection value to ECU 300.

The voltage of battery 120 is supplied to auxiliary device such as ECU 300 and an inverter of an air-conditioner through a DC/DC converter 127.

Relay RY1 has one end connected to the positive electrode of battery 120 and the other end connected to one end of solenoid 230 within starter 200. Relay RY1 is controlled by a control signal SE1 from ECU 300, to switch between supply and cut-off of the power supply voltage from battery 120 to solenoid 230.

Relay RY2 has one end connected to the positive electrode of battery 120 and the other end connected to motor 220 within starter 200. Relay RY2 is controlled by a control signal SE2 from ECU 300, to switch between supply and cut-off of the power supply voltage from battery 120 to motor 220. Furthermore, a voltage sensor 130 is provided in the power line connecting relay RY2 and motor 220. Voltage sensor 130 detects a motor voltage VM, and outputs the detection value to ECU 300.

As described above, relays RY1 and RY2 can independently control supply of the power supply voltage to solenoid 230 and motor 220, respectively, within starter 200.

Output member 250 is coupled to the rotation shaft of the rotor (not shown) within the motor, for example, by a straight spline or the like. Furthermore, pinion gear 260 is provided at the end of output member 250 opposite to motor 220. When relay RY2 is closed to thereby supply a power supply voltage from battery 120 to cause motor 220 to be rotated, output member 250 transmits the rotating operation of the rotor to pinion gear 260 to cause pinion gear 260 to be rotated.

Solenoid 230 has one end connected to relay RY1 as described above and the other end connected to the body earth. When relay RY1 is closed and solenoid 230 is magnetized, solenoid 230 attracts plunger 210 in the direction as indicated by an arrow. In other words, plunger 210 and solenoid 230 constitute an actuator 232.

Plunger 210 is coupled to output member 250 via connection unit 240. Solenoid 230 is magnetized to attract plunger 210 in the direction as indicated by an arrow. Thereby, output member 250 is moved by connection unit 240 having a fixed support point 245 from the standby position shown in FIG. 1 to the direction opposite to the direction in which plunger 210 is operated, that is, moved to the direction in which pinion gear 260 is moved away from the body of motor 220. Furthermore, plunger 210 is applied with force by a spring mechanism that is not shown in the direction opposite to the direction indicated by an arrow in FIG. 1. When solenoid 230 is brought into a non-magnetized state, plunger 210 is returned to the standby position.

In this way, when solenoid 230 is magnetized to thereby cause output member 250 to be operated in the axial direction, pinion gear 260 engages with ring gear 110 provided in the outer circumference of a flywheel or a drive plate attached to crankshaft 111 of engine 100. Then, when pinion gear 260 is rotationally operated in the state where pinion gear 260 and ring gear 110 engage with each other, engine 100 is cranked and started.

Thus, in the present embodiment, actuator 232 and motor 220 are separately controlled, in which actuator 232 causes pinion gear 260 to be moved to engage with ring gear 110 provided in the outer circumference of the flywheel or the drive plate of engine 100 while motor 220 rotates pinion gear 260.

In addition, although not shown in FIG. 1, a one-way clutch may be provided between output member 250 and the rotor shaft of motor 220 so as to prevent the rotor of motor 220 from being rotated by the rotational operation of ring gear 110.

Furthermore, actuator 232 in FIG. 1 is not limited to the above-described mechanism as long as it can transmit the rotation of pinion gear 260 to ring gear 110 and can switch between the state where pinion gear 260 and ring gear 110 engage with each other and the state where these gears do not engage with each other. For example, actuator 232 may have a mechanism by which pinion gear 260 and ring gear 110 are engaged with each other by moving the shaft of output member 250 in the radial direction of pinion gear 260.

Although not shown, ECU 300 includes a CPU (Central Processing Unit), a storage device and an input/output buffer, and receives signals of sensors and output control commands to each device. The control of these components is not limited to processing by means of software. The control may be partially performed using dedicated hardware (electronic circuit).

ECU 300 receives a signal ACC showing the operated amount of accelerator pedal 140 from the sensor (not shown) provided in accelerator pedal 140. ECU 300 receives a signal BRK showing the operated amount of brake pedal 150 from the sensor (not shown) provided in a brake pedal 150. Furthermore, ECU 300 receives a start operation signal IG-ON caused by the driver's ignition operation, and the like. Based on these pieces of information, ECU 300 generates a start request signal and a stop request signal for engine 100, and, in accordance with these signals, outputs control signals SE1 and SE2 to control the operation of starter 200.

For example, upon satisfaction of the stopping condition that the vehicle stops and the driver operates brake pedal 150, the stop request signal is generated and ECU 300 stops engine 100. In other words, when the stopping condition is satisfied, fuel injection and combustion in engine 100 are stopped.

Then, upon satisfaction of the starting condition that the operated amount of brake pedal 150 by the driver reaches zero, the start request signal is generated and ECU 300 drives motor 220 to start engine 100. In addition, engine 100 may be started upon operation of accelerator pedal 140, a shift lever for selecting the shift range or gears, or a switch for selecting the vehicle running modes (for example, a power mode, an eco-mode or the like).

Figure 2:
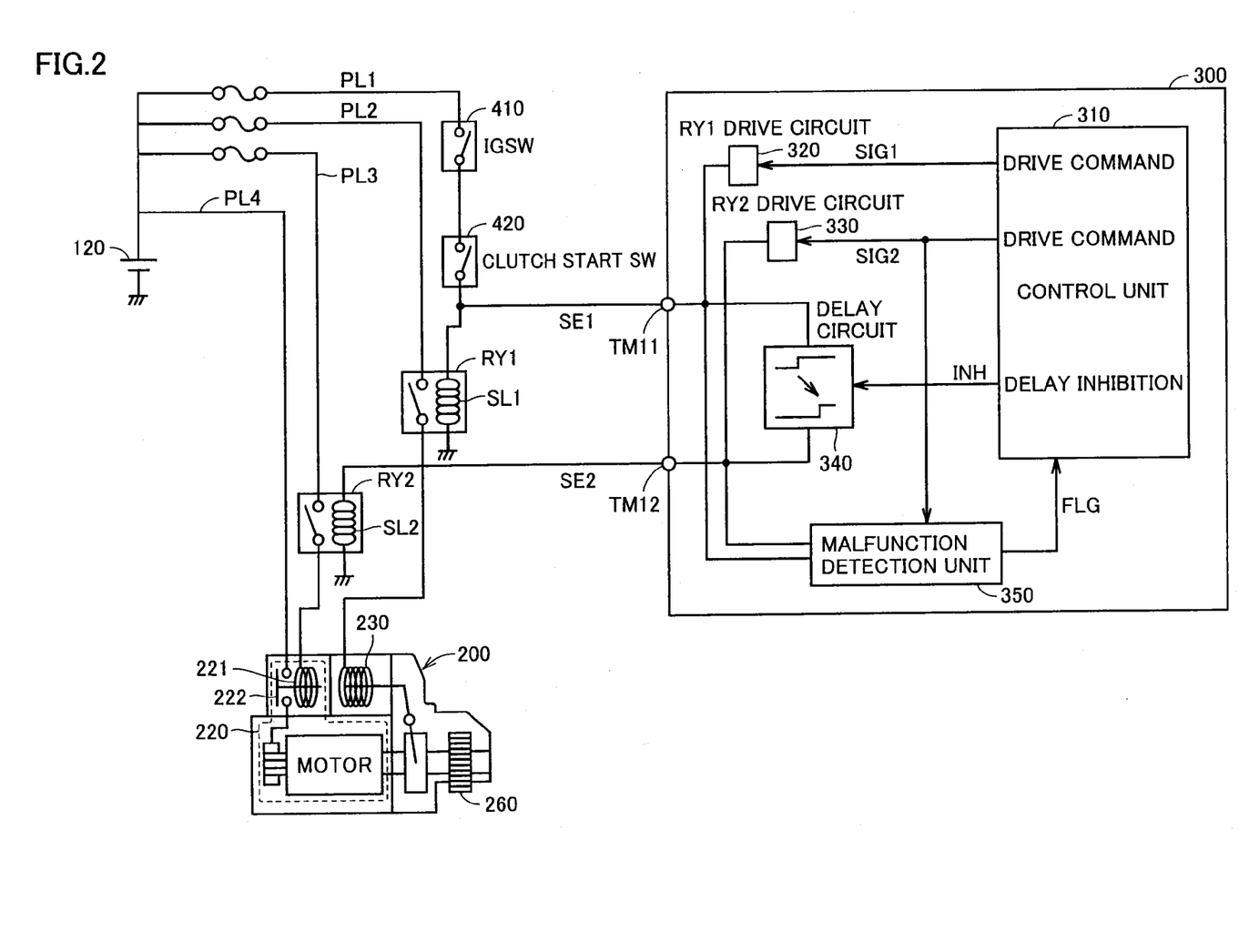
FIG. 2 is a diagram for illustrating the details of a drive circuit of a starter.

FIG. 2 is a diagram for illustrating the details of a drive circuit of starter 200. Referring to FIG. 2, as described in FIG. 1, solenoid 230 in starter 200 receives a power supply voltage from battery 120 through a power line PL2 via relay RY1. Relay RY1 has a contact closed by an internally-provided solenoid SL1 being magnetized by control signal SE1 from ECU 300. Furthermore, solenoid SL1 in relay RY1 receives a power supply voltage from battery 120 through a power line PL1 via an ignition switch IGSW and a clutch start switch 420.

This serves as a circuit for reliably starting engine 100 even in the case where control signal SE1 cannot be appropriately output, for example, due to a reduction in power supply voltage to ECU 300, when first starting the engine in the state where vehicle 10 stops. Solenoid SL1 is magnetized to drive relay RY1 by the start request signal generated by satisfaction of the conditions that clutch start switch 420 is closed that is closed in such a clutch state where motive force is not transmitted to the driving wheel, and that ignition switch IGSW is closed by the user's operation of the ignition key and the like. This start request signal is transmitted also to ECU 300 through the transmission path through which control signal SE1 is transmitted from ECU 300.

Furthermore, the power supply voltage from battery 120 is supplied to a solenoid 221 of the internal switch in motor 220 through a power line PL3 via relay RY2. When solenoid 221 is magnetized, a contact 222 of the internal switch is closed to cause the electric power for driving motor 220 to be supplied from battery 120 through a power line PL4.

ECU 300 includes a control unit 310, a RY1 drive circuit 320, a RY2 drive circuit 330, a delay circuit 340, and a malfunction detection unit 350.

During an eco-run operation and when restarting engine 100 after engine 100 is automatically stopped, control unit 310 generates drive commands SIG1 and SIG2 so as to drive relays RY1 and RY2 at an appropriate timing. Then, control unit 310 outputs drive commands SIG1 and SIG2 to RY1 drive circuit 320 and RY2 drive circuit 330, respectively.

Furthermore, control unit 310 generates a control signal INH for controlling permission and inhibition of the delaying operation by delay circuit 340, and outputs the signal to delay circuit 340.

Delay circuit 340 is electrically connected to terminals TM11 and TM12 from which control signals SE1 and SE2 are output. Delay circuit 340 serves as a circuit for delaying the start request signal input to terminal TM11 to generate control signal SE2 for relay RY2, when starting engine 100 by the user's operation of an ignition key and the like.

When restarting the engine during the eco-run operation, since the output timing of control signals SE1 and SE2 is controlled by control unit 310, this delay circuit 340 is not permitted to perform a delay operation (that is, brought into a non-conductive state) by control signal INH from control unit 310 during the eco-run operation.

Malfunction detection unit 350 serves as a circuit for detecting whether or not a malfunction (failure) occurs in delay circuit 340. It is assumed in the present specification that a failure means not only that the above-described function is completely lost but also that the level of this function becomes lower than its original level.

Delay circuit 340 is always brought into a non-conductive state during eco-run, as described above. However, in the case where a short-circuit fault occurs in the contact within delay circuit 340 to bring about a continuous conductive state, when control signal SE1 for relay RY1 is output even if drive command SIG2 for relay RY2 (that is, a motor) is not output from control unit 310, control signal SE2 is to be immediately output by delay circuit 340. This causes rotating pinion gear 260 to be brought into contact with ring gear 110. Therefore, when this malfunction is left unnoticed by the user, wear-out of both gears is promoted to deteriorate durability while the noise of contact between the gears is increased, which may cause the user discomfort.

For that reason, malfunction detection unit 350 determines based on control signals SE1, SE2 and motor drive command SIG2 whether or not there is a possibility that a malfunction occurs in delay circuit 340.

In addition, when malfunction detection unit 350 determines whether or not a malfunction occurs in delay circuit 340, there may be a case where a malfunction is erroneously detected due to the influence of temporary signal noise. Therefore, in determining whether a malfunction occurs or not in delay circuit 340, malfunction detection unit 350 confirms that a malfunction occurs in delay circuit 340 only when the state determined that there is a possibility of occurrence of a malfunction (a temporary malfunction state) continues for a prescribed time period.

On the other hand, when control unit 310 receives, from malfunction detection unit 350, a temporary malfunction flag FLG showing that the temporary malfunction state has been detected, control unit 310 delays the output timing of motor drive command SIG2 as compared with the normal state without malfunctions, such that malfunction detection unit 350 can confirm the malfunction.

Figure 3:
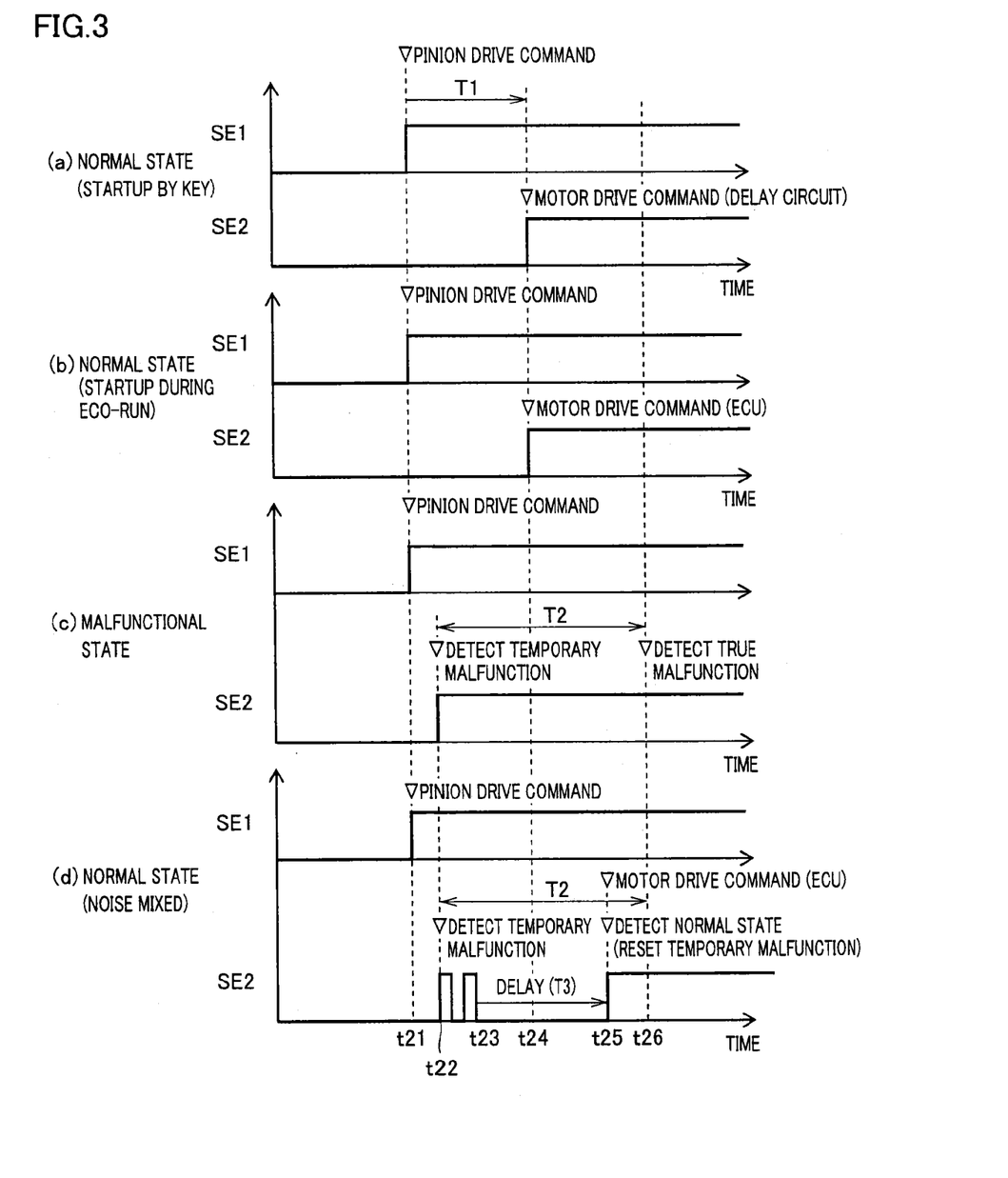
FIG. 3 is a diagram for illustrating an outline of malfunction detection control for a delay circuit in the present embodiment.

FIG. 3 is a time chart for illustrating an outline of malfunction detection control for the delay circuit in the present embodiment. From the upper stage, FIG. 3 shows (a) a time chart at startup in the normal state by an ignition key; (b) a time chart at startup in the normal state during the eco-run operation; (c) a time chart at startup in the case where a malfunction occurs in delay circuit 340; and (d) a time chart at startup in the case where noise is mixed, though in the normal state, during the eco-run operation. In FIGS. 3(a) to 3(d), for better understanding, the timings at which the engagement operation for pinion gear 260 is started (the timings at which control signal SE1 is turned on) are set identical at time t21.

Referring to FIGS. 2 and 3(a), in the normal state, when the start request signal is output at time t21 by operating the ignition key, relay RY1 is closed at time t21 to magnetize solenoid 230, which causes actuator 232 to be driven.

Then, the start request signal is delayed by delay circuit 340 by a prescribed time period T1 set based on the time at which the engagement operation should be completed, and control signal SE2 is output at time t24. Consequently, relay RY2 is closed to drive motor 220.

Referring to FIG. 3(b), when restarting the engine during eco-run, drive command SIG1 is output from control unit 310 in response to satisfaction of the prescribed restarting condition, thereby causing control signal SE1 to be output from ECU 300 (time t21). Then, after a lapse of the above-described prescribed time period T1 (time t24), drive command SIG2 is output from control unit 310, thereby causing control signal SE2 to be output from ECU 300. Consequently, relay RY2 is closed to drive motor 220.

Referring to FIG. 3(c), in the case where a malfunction occurs in delay circuit 340 due to a short circuit in the internal contact, control signal SE2 is output shortly after control signal SE1 is output during eco-run (time t22). In this case, control unit 310 does not output motor drive command SIG2. As described later with reference to FIG. 3(d), it may be temporarily recognized due to the signal noise that control signal SE2 is output. Accordingly, based on satisfaction of the conditions that control signal SE1 is ON, motor drive command SIG2 is OFF and control signal SE2 is ON, malfunction detection unit 350 determines that a temporary malfunction state is brought about. Then, temporary malfunction flag FLG is output to control unit 310.

In control unit 310, the output of motor drive command SIG2 is delayed in response to reception of temporary malfunction flag FLG.

In the case where a malfunction occurs in delay circuits 340, the temporary malfunction state detected at time t22 continues. After a lapse of a prescribed time period T2 during which the temporary malfunction state continues (time t26), malfunction detection unit 350 confirms that a true malfunction occurs.

When this true malfunction is confirmed, a warning device (not shown) or the like notifies the user of occurrence of a malfunction. Even if a true malfunction is confirmed, motor 220 is rotated by means of control signal SE2, and therefore, engine 100 can be started. However, when the engine is intermittently stopped on a frequent basis due to eco-run, wear-out of gears is further promoted. Accordingly, it is preferable to inhibit the engine from being intermittently stopped after a true malfunction is confirmed.

Then, referring to FIG. 3(d), in the case where control signal SE2 is temporarily ON at time t22 under the influence of signal noise when control signal SE1 is output during eco-run, as in FIG. 3(c), malfunction detection unit 350 determines that a temporary malfunction state occurs. Then, temporary malfunction flag FLG is output to control unit 310.

However, since noise temporarily occurs in the case in FIG. 3(d), control signal SE2 is again turned OFF at time t23. Thus, the temporary malfunction state is cancelled. It is to be noted that temporary malfunction flag FLG in malfunction detection unit 350 is not yet reset and control unit 310 delays output of motor drive command SIG2.

Then, at the point of time (time t25) at which the normal state has continued for a prescribed time period T3 (T3<T2) from time t23 at which the temporary malfunction state is cancelled, malfunction detection unit 350 determines that the status is normal. Then, when temporary malfunction flag FLG is reset, control unit 310 outputs motor drive command SIG2. Consequently, control signal SE2 is output to start engine 100.

Although not shown in FIG. 3, when control signal SE2 is kept intermittently output due to malfunctions in delay circuit 340 and the like, there occurs no situation that the state where the temporary malfunction state is cancelled (that is, the normal state) continues for prescribed time period T3. Therefore, temporary malfunction flag FLG is not canceled. Accordingly, as in FIG. 3(c), it is determined that a true malfunction occurs after a lapse of prescribed time period T2.

Then, the details of the malfunction detection control process performed in ECU 300 will be described with reference to the flowcharts in FIGS. 4 and 5.

Figure 4:
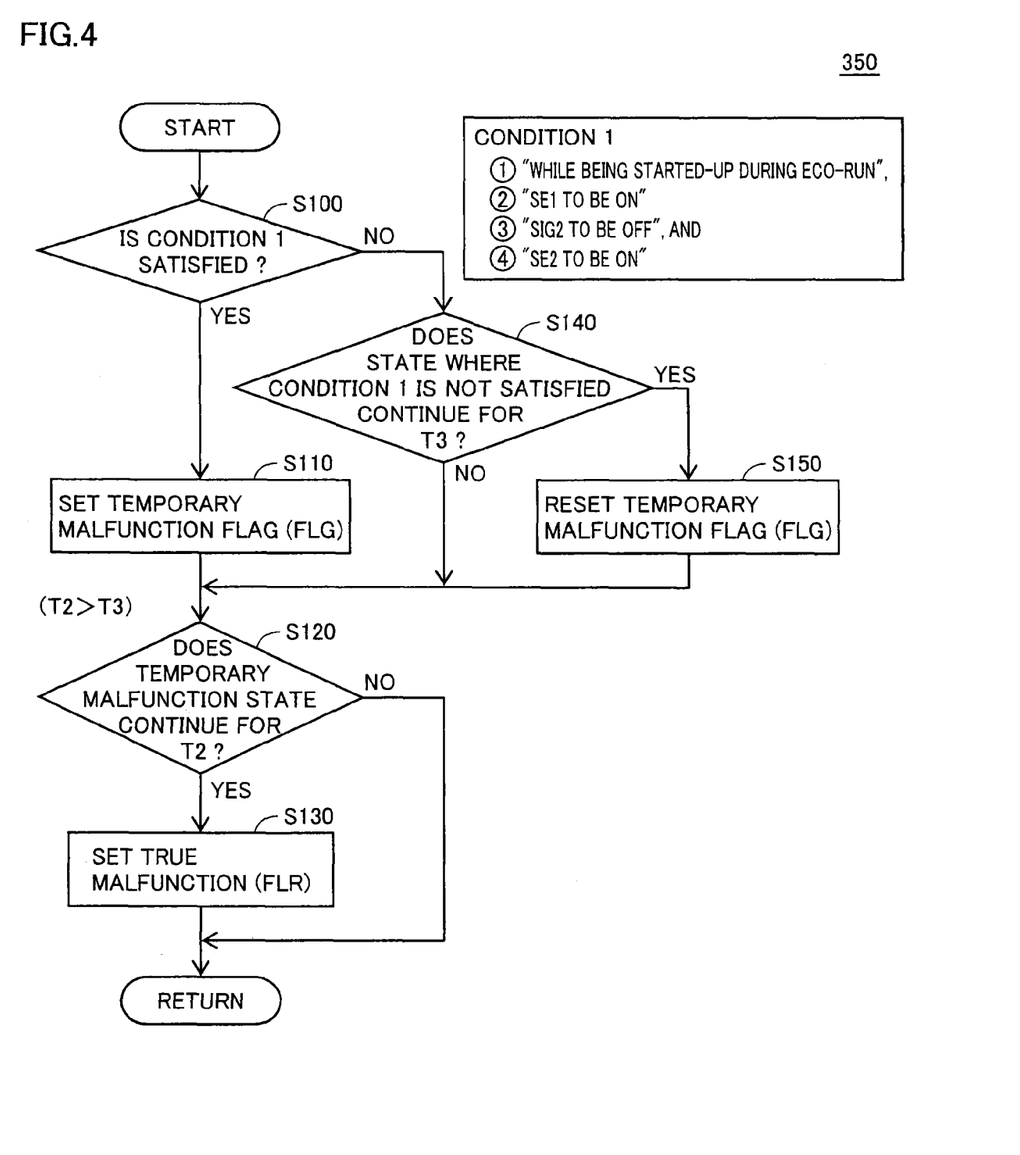
FIG. 4 is a flowchart for illustrating a malfunction detection control process for the delay circuit performed in a malfunction detection unit in the present embodiment.

FIG. 4 is a flowchart for illustrating the malfunction detection control process for the delay circuit performed in malfunction detection unit 350 in the present embodiment.

Referring to FIGS. 2 and 4, in step (which will be hereinafter abbreviated as S) 100, malfunction detection unit 350 determines whether a prescribed condition 1 is satisfied or not. Prescribed condition 1 is that, while being started-up during eco-run, in the state where control signal SE1 of relay RY1 for driving actuator 232 is set to be ON, even though drive command SIG2 of relay RY2 for driving motor 220 is not output, control signal SE2 is set to be ON.

When this prescribed condition 1 is satisfied (YES in S100), malfunction detection unit 350 determines that there is a possibility that a malfunction occurs in delay circuit 340, and the process proceeds to S110, in which temporary malfunction flag FLG is set to be ON. Then, the process proceeds to S120.

When prescribed condition 1 is not satisfied (NO in S100), the process proceeds to S140, in which it is determined whether or not the state where condition 1 is not satisfied continues for a predetermined time period (T3).

When the state where condition 1 is not satisfied continues for T3 (YES in S140), malfunction detection unit 350 determines that a malfunction does not occur in delay circuit 340, or that the previously detected malfunction is highly likely to be a temporary malfunction resulting from noise or the like. Then, the process proceeds to S150, in which temporary malfunction flag FLG is set to be OFF. In addition, if the temporary malfunction flag is not ON from the beginning, the OFF state is maintained. Then, the process proceeds to S120.

When the state where condition 1 is not satisfied does not continue for prescribed time period T3 (NO in S140), there is a state that (1) no malfunction occurs in delay circuit 340 and temporary malfunction flag FLG remains OFF, but a lapse of prescribed time period T3 is waited; (2) a lapse of prescribed time period T3 is waited after temporary malfunction flag FLG is set to be ON due to the influence of temporary noise, or (3) control signal SE2 is repeatedly turned ON/OFF intermittently due to noise or a malfunction in delay circuit 340.

In the case of the above-described situation, since malfunction detection unit 350 still cannot determine whether or not a malfunction occurs in delay circuit 340, the process proceeds to S120 while malfunction detection unit 350 maintains the state of temporary malfunction flag FLG.

In S120, malfunction detection unit 350 determines whether or not the temporary malfunction state, that is, the state where temporary malfunction flag FLG is set to be ON, continues for time period T2 (T2>T3).

When the state where temporary malfunction flag FLG is set to be ON continues for time period T2 (YES in S120), malfunction detection unit 350 determines that a malfunction occurs in delay circuit 340. Then, in S130, malfunction detection unit 350 confirms the malfunction and sets a true malfunction flag FLR to be ON, which is then output. When true malfunction flag FLR is set to be ON, for example, a warning device that is not shown notifies the user of occurrence of the malfunction.

Although not shown, when it is determined that a true malfunction occurs, control unit 310 may limit an automatic stop of the engine caused by eco-run. Furthermore, for example, in the case where the relay (not shown) is provided that can electrically separate the input to or the output from delay circuit 340, control unit 310 may open this relay upon determination of the true malfunction, thereby limiting startup of the engine using delay circuit 340.

When the state where temporary malfunction flag FLG is set to be ON does not continue for time period T2 (NO in S120), there are states that temporary malfunction flag FLG is not set and that a lapse of time period T2 is waited though temporary malfunction flag FLG is set.

In the case of the above-described situation, the state of the present temporary malfunction flag FLG is maintained, and the process is returned to the first step.

By performing the control in accordance with the above-described process, the malfunction detection unit can detect a malfunction in the delay circuit.

Then, the motor drive control process performed by control unit 310 will be described with reference to FIG. 5. The flowchart shown in FIG. 5 is implemented by executing the program stored in control unit 310 in advance in predetermined cycles. Alternatively, for a part of the steps, dedicated hardware (electronic circuit) may be configured to execute the process.

Figure 5:
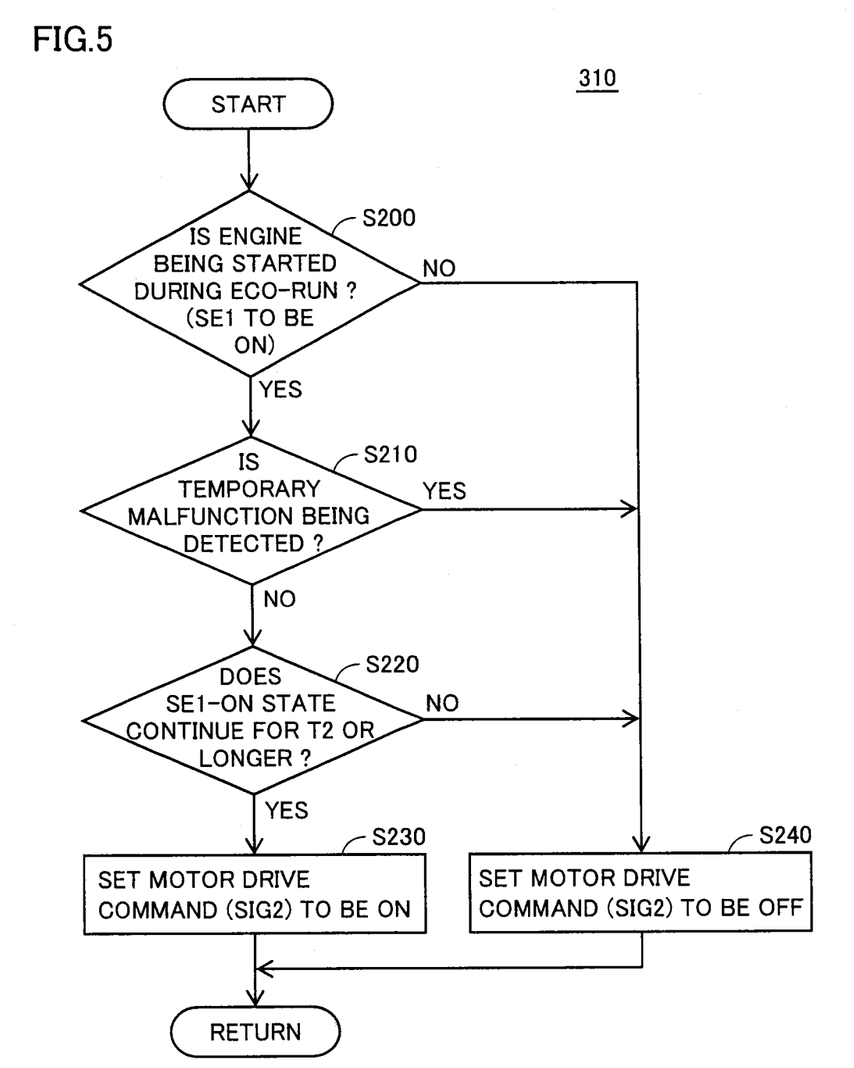
FIG. 5 is a flowchart for illustrating a motor drive control process performed in a control unit in the present embodiment.

Referring to FIGS. 2 and 5, control unit 310 determines in S200 whether or not the engine is being restarted during eco-run. When the engine is being restarted, control signal SE1 (or drive command SIG1) is set to be ON.

When the engine is not being restarted (NO in S200), engine 100 is not started. Accordingly, control unit 310 proceeds the process to S240 and sets motor drive command SIG2 to be OFF.

When the engine is being restarted (YES in S200), the process proceeds to S210. Then, control unit 310 determines whether or not temporary malfunction flag FLG is set to be ON in malfunction detection unit 350.

When a temporary malfunction is detected (YES in S210), control unit 310 proceeds the process to S240 to set motor drive command SIG2 to be OFF in order to delay driving of motor 220.

When a temporary malfunction is not detected (NO in S210), the process proceeds to S220, in which control unit 310 determines whether or hot the state where control signal SE1 is ON continues for time period T1.

When the state where control signal SE1 is ON does not continue for time period T1 (NO in S220), completion of the engagement operation between pinion gear 260 and ring gear 110 is being waited. Accordingly, control unit 310 proceeds the process to S240, and sets motor drive command SIG2 to be OFF.

When the state where control signal SE1 is ON continues for time period T1 (YES in S220), control unit 310 determines that the engagement operation is completed, and then, sets motor drive command SIG2 to be ON in step S230.

By performing the control in accordance with the above-described process, the temporary malfunction flag set by the malfunction detection unit is used to delay driving of the motor, when there is a possibility that a malfunction occurs in the delay circuit. Thereby, a malfunction in the delay circuit can be distinguished from the influence resulting from noise.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10 vehicle, 100 engine, 110 ring gear, 111 crankshaft, 115 rotation speed sensor, 120 battery, 125, 130 voltage sensor, 127 DC/DC converter, 140 accelerator pedal, 150 brake pedal, 200 starter, 210 plunger, 220 motor, 221, 230, SL1, SL2 solenoid, 222 contact, 232 actuator, 240 connection unit, 245 support point, 250 output member, 260 pinion gear, 300 ECU, 310 control unit, 320, 330 drive circuit, 340 delay circuit, 350 malfunction detection unit, 410 IGSW, 420 clutch start switch, PL1 to PL4 power line, RY1, RY2 relay, TM11, TM12 terminal.

The invention claimed is:

1. A control device for an engine provided with a starter including a second gear that can be engaged with a first gear coupled to a crankshaft, an actuator causing, in a driven state, said second gear to be moved to a position at which said second gear engages with said first gear, and a motor rotating said second gear, said actuator and said motor being separately controllable by a signal driving said actuator and a signal driving said motor, respectively, and said control device comprising a delay circuit, upon reception of a manually-operable start request, delaying the signal driving said actuator generated by said start request to generate the signal driving said motor, wherein when restarting said engine after said engine is automatically stopped, said control device generates the signal driving said actuator and the signal driving said motor, and detects a failure in said delay circuit based on an output status of each of the signal driving said actuator and the signal driving said motor.

2. The control device for an engine according to claim 1, wherein said control device further comprises a control unit generating the signal driving said actuator and the signal driving said motor when restarting said engine after said engine is automatically stopped, and when restarting said engine and after providing an output of the signal driving said actuator, in a case of a first state where the signal driving said motor is output from said control device even though the signal driving said motor is not output from said control unit, said control unit extends a time period from a time when the signal driving said actuator is output until a time when the signal driving said motor is output, such that said time period is longer than a time period in a case of a second state where the signal driving said motor is not output from said control device in the state where the signal driving said motor is not output from said control unit, and said control unit determines that a temporary malfunction occurs in said delay circuit when said first state is brought into said second state within the extended time period.

3. The control device for an engine according to claim 2, wherein said control device further comprises a detection unit for detecting a failure in said delay circuit, and when restarting said engine, in the case of said first state, said detection unit determines that a failure occurs in said delay circuit.

4. The control device for an engine according to claim 3, wherein said detection unit determines that a true failure occurs in said delay circuit, when a state determined as a failure occurring in said delay circuit continues for a predetermined first time period.

5. The control device for an engine according to claim 4, wherein, when said detection unit determines that a true failure occurs in said delay circuit, said detection unit notifies a user of occurrence of a failure in said delay circuit.

6. The control device for an engine according to claim 2, wherein, after it is determined that a failure occurs in said delay circuit, and when said second state continues for a second time period, said control unit cancels a determination that a failure occurs in said delay circuit.

7. The control device for an engine according to claim 1, wherein said control device limits startup of the engine using said delay circuit when it is determined that a failure occurs in said delay circuit.

8. The control device for an engine according to claim 1, wherein said control device limits an automatic stop of the engine using said delay circuit when it is determined that a failure occurs in said delay circuit.

9. A vehicle comprising:

an engine;

a starter including a second gear that can be engaged with a first gear coupled to a crankshaft, an actuator causing, in a driven state, said second gear to be moved to a position at which said second gear engages with said first gear, and a motor rotating said second gear; and a control device controlling said starter, said actuator and said motor being separately controllable by a signal driving said actuator and a signal driving said motor, respectively, and said control device including a delay circuit, upon reception of a manually-operable start request, delaying the signal driving said actuator generated by said start request to generate the signal driving said motor, wherein when restarting said engine after said engine is automatically stopped, said control device generates the signal driving said actuator and the signal driving said motor, and detects a failure in said delay circuit based on an output status of each of the signal driving said actuator and the signal driving said motor.

* * * * *